(12) United States Patent
Scalisi et al.

(10) Patent No.: US 11,256,878 B1
(45) Date of Patent: Feb. 22, 2022

(54) DIRECTED SOUND TRANSMISSION SYSTEMS AND METHODS

(71) Applicant: Zaps Labs Inc., Austin, TX (US)

(72) Inventors: Joseph Frank Scalisi, Lakeway, TX (US); Tyler James Gilbreth, Riverside, CA (US); Steven Christopher Lynch, San Juan Capistrano, CA (US); Adrian Simon Lanch, Lakeway, TX (US)

(73) Assignee: ZAPS LABS, INC., Austin, TX (US)

( * ) Notice: Subject to any disclaimer, the term of this patent is extended or adjusted under 35 U.S.C. 154(b) by 0 days.

(21) Appl. No.: 17/364,716

(22) Filed: Jun. 30, 2021

Related U.S. Application Data

(60) Provisional application No. 63/121,851, filed on Dec. 4, 2020.

(51) Int. Cl.
*G06F 15/00* (2006.01)
*G06F 40/47* (2020.01)
(Continued)

(52) U.S. Cl.
CPC .............. *G06F 40/47* (2020.01); *G08B 5/38* (2013.01); *G10K 11/17815* (2018.01); *G10K 11/17873* (2018.01); *G10L 15/005* (2013.01); *G10L 15/183* (2013.01); *G10L 15/22* (2013.01); *G10L 25/51* (2013.01); *H04R 1/025* (2013.01); *H04R 1/323* (2013.01); *G10K 2200/10* (2013.01); *G10K 2210/128* (2013.01);
(Continued)

(58) Field of Classification Search
CPC .............. G06F 40/47; G10K 11/17873; G10K 11/17815
See application file for complete search history.

(56) References Cited

U.S. PATENT DOCUMENTS

| | | |
|---|---|---|
| 4,823,908 A | 4/1989 | Tanaka |
| 4,827,520 A | 5/1989 | Zeinstra |

(Continued)

FOREIGN PATENT DOCUMENTS

WO 2003026343 A2 3/2003

OTHER PUBLICATIONS

Android Source—Multi-Zone Overview—Android Source—Available at least as of Oct. 28, 2020—Available from Internet <URL: https://source.android.com/devices/automotive/audio/multi_zone/overview>—Retrieved from Internet <URL: https://web.archive.org/web/20201130163810/https://source.android.com/devices/automotive/audio/multi_zone/overview>.

(Continued)

*Primary Examiner* — Simon King
(74) *Attorney, Agent, or Firm* — Wesley E. Schwie, Esq.; Gallium Law

(57) ABSTRACT

A method for providing directed transmission of sound waves, through modulation on an ultrasonic carrier, may comprise connecting, at least one directed sound source to an audio system, emitting, via the at least one directed sound source, audio from the audio system, wherein the emitting comprises emitting medium frequency audio sound waves and higher frequency audio sound waves. The audio may be selected via a master control unit, which may be operatively coupled to a mobile application. In many embodiments, a first audio selection is configured to be heard only through a first directed sound source, and a second audio selection is configured to be heard only through a second directed sound source.

23 Claims, 14 Drawing Sheets

(51) Int. Cl.
  *G10L 15/22* (2006.01)
  *G10L 15/183* (2013.01)
  *G10L 25/51* (2013.01)
  *G10K 11/178* (2006.01)
  *H04R 1/32* (2006.01)
  *H04R 1/02* (2006.01)
  *G08B 5/38* (2006.01)
  *G10L 15/00* (2013.01)

(52) U.S. Cl.
  CPC .............. *G10K 2210/3027* (2013.01); *G10K 2210/3044* (2013.01); *H04R 2499/13* (2013.01)

(56) References Cited

U.S. PATENT DOCUMENTS

| | | | |
|---|---|---|---|
| 5,680,468 | A | 10/1997 | Hout |
| 5,885,129 | A | 3/1999 | Norris |
| 6,055,478 | A | 4/2000 | Heron |
| 6,427,017 | B1 | 7/2002 | Toki |
| 6,631,196 | B1 | 10/2003 | Taenzer |
| 6,914,991 | B1 | 7/2005 | Pompei |
| 7,343,017 | B2 | 3/2008 | Norris |
| 7,440,578 | B2 | 10/2008 | Arai |
| 7,596,228 | B2 | 9/2009 | Pompei |
| 7,909,466 | B2 | 3/2011 | Fukui |
| 8,027,488 | B2 | 9/2011 | Pompei |
| 8,290,173 | B2 | 10/2012 | Richenstein |
| 8,369,546 | B2 | 2/2013 | Pompei |
| 8,879,766 | B1 | 11/2014 | Zhang |
| 8,958,580 | B2 | 2/2015 | Norris |
| 9,036,827 | B2 | 5/2015 | Pompei |
| 9,113,260 | B2 | 8/2015 | Norris |
| 9,319,802 | B2 | 4/2016 | Norris |
| 9,368,098 | B2 | 6/2016 | Kappus |
| 9,369,805 | B2 | 6/2016 | Wilson |
| 9,411,511 | B1 | 8/2016 | Sivertsen |
| 9,510,089 | B2 | 11/2016 | Norris |
| 9,532,153 | B2 | 12/2016 | Olsen |
| 9,820,055 | B2 | 11/2017 | Babayoff |
| 10,150,425 | B1 | 12/2018 | Scalisi |
| 10,160,399 | B1 | 12/2018 | Scalisi |
| 10,187,724 | B2 | 1/2019 | Tsai |
| 10,591,869 | B2 | 3/2020 | Smalley |
| 2006/0290315 | A1 | 12/2006 | Hosoi |
| 2008/0273711 | A1 | 11/2008 | Broussard |
| 2009/0116660 | A1 | 5/2009 | Croft |
| 2011/0033074 | A1 | 2/2011 | Chang |
| 2011/0261021 | A1 | 10/2011 | Modarres |
| 2013/0259254 | A1 | 10/2013 | Xiang |
| 2014/0072155 | A1 | 3/2014 | Norris |
| 2014/0104988 | A1 | 4/2014 | Norris |
| 2015/0007025 | A1 | 1/2015 | Sassi |
| 2015/0104026 | A1 | 4/2015 | Kappus |
| 2015/0104045 | A1* | 4/2015 | Norris ............... H04R 23/00 381/120 |
| 2015/0104046 | A1* | 4/2015 | Norris ............... B06B 1/02 381/150 |
| 2015/0110333 | A1* | 4/2015 | Norris ............... H04R 1/32 381/394 |
| 2017/0276764 | A1 | 9/2017 | Vilermo |

OTHER PUBLICATIONS

Baur, Francis X.—Attenuation Values of a Noise-Cancelling Headphone—Hearing Review—Jun. 3, 2008—Available from Internet <URL: https://www.hearingreview.com/hearing-products/attenuation-values-of-a-noise-cancelling-headphone>.
Corby, Siephen—How car audio is changing—Cars Guide—Aug. 21, 2020—Available from Internet <URL: https://www.carsguide.com.au/urban/last-mile/how-car-audio-is-changing-80278>.
Wadhwani, Preeti; Saha, Prasenjit—Automotive Speaker Market—Global Market Insights—May 2020—Available from Internet <URL: https://www.gminsights.com/industry-analysis/automotive-audio-system-market>—Retrieved from Internet <URL: https://web.archive.org/web/20200621021629/https://www.gminsights.com/industry-analysis/automotive-audio-system-market>.
Geyser, Werner—How much do Spotify Ads Cost? | The Ultimate Guide to Advertising on Spotify—Influencer Marketing Hub—Available at least as of Dec. 2020—Available from Internet <URL:https://influencermarketinghub.com/spotify-ads-cost/>.
Jiang, Jingjing—More Americans are using ride-hailing apps—Pew Research Center—Jan. 4, 2019—Available from Internet <URL: https://www.pewresearch.org/fact-tank/2019/01/04/more-americans-are-using-ride-hailing-apps/>.
Audio Drom—What are Realistic Volume Levels?—Audio Drom—Oct. 18, 2014—Available from Internet <URL: http://www.audiodrom.net/en/as-we-see-it-tips-thoughts/74-realistic-volume-levels>.
Knowledge Sourcing Intelligence—Global Data Broker Market Size, Share, Opportunities and Trends—Knowledge Sourcing Intelligence—May 2020—Available from Internet <URL: https://www.knowledge-sourcing.com/report/global-data-broker-market>—Retrieved from Internet <URL: https://web.archive.org/web/20200806134723/https://www.knowledge-sourcing.com/report/global-data-broker-market>.
Kurz, Christopher; Li, Geng; Vine, Daniel—The Young and the Carless? The Demographics of New Vehicle Purchases—Federal Reserve FEDS Notes—Jun. 24, 2016—Available from Internet <URL: https://www.federalreserve.gov/econresdata/notes/feds-notes/2016/the-young-and-the-carless-the-demographics-of-new-vehicle-purchases-20160624.htm>.
Mathews, T.J.; Hamilton, Brady E.—Mean Age of Mothers is on the Rise: United States, 2000-2014—NCHS Data Brief, No. 232—Jan. 2016—Available from Internet <URL: https://www.cdc.gov/nchs/data/databriefs/db232.pdf>.
Mazlan, R.; Saim, L.; Thomas, A.; Said, R.; Liyab, B.—Ear infection and Hearing Loss Amongst Headphone Users—Malaysian Journal of Medical Sciences, vol. 9, No. 2, pp. 17-22—Jul. 2002—Available from Internet <URL: https://www.ncbi.nlm.nih.gov/pmc/articles/PMC3406203/pdf/mjms-9-2-017.pdf>.
McKinsey & Company—Monetizing car data—McKinsey & Company—Sep. 29, 2016—Available from Internet <URL: https://www.mckinsey.com/industries/automotive-and-assembly/our-insights/monetizing-car-data#>.
NIH—Listen Up!—NIDCD—Jun. 29, 2017—Available from Internet <URL: https:www.nidcd.nih.gov/listen-text-only-version>.
Power Digital—How to Advertise on Spotify—Power Digital—Mar. 2, 2018—Available from Internet <URL: https://powerdigitalmarketing.com/blog/how-to-advertise-on-spotify/#gref>.
Harman—ISZ Individual Sound Zones—Brochure—Available at least as of Dec. 2020—Available from Internet <URL: https://www.individualsoundzones.com/downloads/ISZ_Brochure.pdf>.
Sony—Vision S—Sony—Available at least as of Dec. 2020—Available from Internet <URL: https://www.sony.com/en/SonyInfo/vision-s/>.
Hyundai—Hyundai showcases next-generation Separated Sound Zone technology—Hyundai Newsroom—Aug. 14, 2018—Available from Internet <URL: https://www.hyundai.news/eu/articles/press-releases/hyundai-motor-company-showcases-next-generation-separated-sound-zone-technology.html>.
Norris, Woody—Woody Norris: Hypersonic sound and other inventions—TED Talks—YouTube video by user TED—Jan. 27, 2009—Available from Internet <URL: https://www.youtube.com/watch?v=HF9G9MOcROE>.
Plesniak, Wendy; Pappu, Ravikanth—Coincident Display Using Haptics and Holographic Video—Proceedings of Conference on Human Factors in Computing Systems (CHI'98), ACM—Apr. 1998—Available from Internet <URL https://www.media.mit.edu/spi/SPIPapers/wjp/chi98.pdf>.
Chang, Ji-Ho; Lee, Chan-Hui; Park, Jin-Young; Kim, Yang-Hann—A realization of sound focused personal audio system using acoustic contrast control—The Journal of the Acoustical Society of America vol. 125(4), pp. 2091-2097—May 2009—Available from

(56) References Cited

OTHER PUBLICATIONS

Internet <URL: https://www.researchgate.net/publication/24264779_A_realization_of_sound_focused_personal_audio_system_using_acoustic_contrast_control>.

* cited by examiner

DIRECTED SOUND TRANSMISSION SYSTEMS AND METHODS

CROSS-REFERENCE TO RELATED APPLICATIONS

The entire contents of the following application are incorporated by reference herein: U.S. Provisional Patent Application No. 63/121,851; filed Dec. 4, 2020; and entitled DIRECTED SOUND TRANSMISSION SYSTEMS AND METHODS.

BACKGROUND

For decades, automotive and transportation manufacturers have talked about and worked to transform the in-vehicle experience into a peaceful sonic cocoon. Much time and energy has been invested toward isolating passengers from the outside world, in terms of traffic, road, and powertrain noises. However, connected devices are becoming a threat to the sought-after tranquility of commuting. As cars become smarter and more connected, the driver experiences more cognitive distractions than ever before. Games blaring in the backseat, jarring Bluetooth phone calls, and constant vehicle and navigation notifications not only increase the stress levels of everyone in a vehicle, but lead to unsafe driver distraction. As a result, original equipment manufacturers are focusing on hands-free technology as well as minimizing visual and audio disturbances and are starting to require allowances in software and processors for zoned audio systems.

SUMMARY

The disclosure includes methods for performing live translation. In some embodiments, the method comprises taking a plurality of audio samples at a plurality of locations within a listening environment; determining an associated language at one of the plurality of locations within the listening environment; translating an associated language at one or more of the plurality of locations within the listening environment to the associated language of another of the one or more of the plurality of locations within the listening environment; modulating one or more ultrasonic pressure waves by audio content, in a language associated with one or more target locations in the listening environment, to produce one or more modulated carrier signals; and sending the one or more modulated carrier signals, to one or more target locations in the listening environment, through a transmission medium. In some embodiments, in connection with the one or more ultrasonic pressure waves reaching the one or more target locations, the one or more modulated carrier signals demodulate, thereby delivering audio content in the associated language of one or more target locations.

In some embodiments, the listening environment is a vehicle selected from the group consisting of a vehicle having an internal combustion engine, an electric vehicle, and a combination thereof. In some embodiments, each of the plurality of locations within the listening environment is a seating location within the listening environment.

As well, in some embodiments, the method further comprises producing white Gaussian noise; modulating the one or more ultrasonic pressure waves by the Gaussian noise to produce one or more modulated noise signals; and transmitting, to the one or more target locations in the listening environment, the one or more modulated noise signals through the transmission medium.

The disclosure also includes methods for performing live translation. In some embodiments, the method comprises sampling sound by taking one or more sound samples from a listening environment; identifying a language, when present, inherent within audio information received from the one or more sound samples; producing an audio content signal from the audio information in the language; determining noise in the listening environment; producing a noise signal from the noise; producing an inverted noise signal by inverting the noise signal; generating a first modulated ultrasonic signal by modulating an ultrasonic carrier with the inverted noise signal; generating a second modulated ultrasonic signal by modulating an ultrasonic carrier with the audio content signal; and transmitting, to a target in the listening environment, an ultrasonic pressure wave, representative of the first modulated ultrasonic signal and the second modulated ultrasonic signal, through a transmission medium.

In some embodiments, the listening environment is selected from the group consisting of a vehicle environment, a ride sharing environment, and mass transportation. In some embodiments, the method includes controlling the live translation using a mobile application. Even still, in some embodiments, the target is one of a plurality of seat positions in the vehicle environment.

The disclosure also includes methods of performing live translation. In some embodiments, the method includes sampling sound by taking one or more sound samples from a plurality of different locations within a listening environment; identifying a language, when present, inherent within audio information received from one or more sound samples from each location within the listening environment; producing an audio content signal for an associated location from the audio information received from the one or more sound samples for each location within the listening environment, in the language; determining noise in the listening environment; producing a noise signal from the noise; producing an inverted noise signal by inverting the noise signal; generating a first modulated ultrasonic signal by modulating an ultrasonic carrier with the inverted noise signal; generating a second modulated ultrasonic signal, for an associated location, by modulating an ultrasonic carrier with the audio content signal from an associated location; and transmitting, to a selected location within the listening environment, an ultrasonic pressure wave, representative of the first modulated ultrasonic signal and the second modulated ultrasonic signal associated with the selected location, through a transmission medium.

In some embodiments, the listening environment is selected from the group consisting of a vehicle environment, a ride sharing environment, a restaurant, a lobby, a sports bar a kiosk with live translation capability and a combination thereof. As well, in some embodiments, the plurality of different locations in the listening environment is representative of a mobile device having the capability of receiving an ultrasonic beacon from an ultrasonic transducer. In some embodiments, controlling directional sound transmission using a mobile application. As well, in some embodiments, wherein the selected location within the listening environment is one of a plurality of seat positions in a vehicle environment.

The disclosure also includes a focused beam directional speaker system. In some embodiments, the system comprises a noise detector; at least one microphone; a noise cancelling processor configured to produce a noise signal, representative of noise detected by the noise detector, and an inverse noise signal produced by inverting the noise signal;

an audio processor configured to identify a language, when present, inherent within audio information received from the at least one microphone and to produce an audio content signal from audio information in the language; a summer configured to produce a combined input signal by summing the inverse noise signal and the audio content signal; a modulator configured to produce a modulated carrier signal by modulating an ultrasonic carrier signal with the combined input signal; and at least one ultrasonic focused beam directional speaker configured to send, to a target in a listening environment, an ultrasonic pressure wave, representative of the modulated carrier signal, through a transmission medium, wherein in connection with the ultrasonic pressure wave reaching the target, the modulated carrier signal demodulates, thereby canceling noise and delivering the audio content signal to the target in the listening environment.

In some embodiments, the at least one microphone is operatively associated with the at least one ultrasonic focused beam directional speaker. In some embodiments, the system further comprises a master controller, being operable to control the focused beam directional speaker system, coupled to the ultrasonic focused beam directional speaker. The master controller may operatively control, via a wireless link, the at least one ultrasonic focused beam directional speaker. In some embodiments, the master controller operatively controls, via a wired link, the at least one ultrasonic focused beam directional speaker.

In some embodiments, a light is associated with each speaker of the at least one ultrasonic focused beam directional speaker. The light may be operable to illuminate a color in a blinking manner to identify a speaker of the at least one ultrasonic focused beam directional speaker. In some embodiments, the light is operatively synced to music. In some embodiments, the light is operative to perform a function consisting of blinking, displaying a solid color or displaying a combination of different colors. The light may be a red-green-blue (RGB) light emitting diode (LED).

In some embodiments, one or more locations in the listening environment is representative of a mobile device having a capability of receiving an ultrasonic beacon from an ultrasonic transducer; accordingly, the noise detector, the at least one microphone, the noise cancelling processor, the summer, the modulator and the ultrasonic transducer may be controllable remotely. The audio processor may be programmed in connection with an application executed on a mobile device. In some embodiments, the at least one ultrasonic focused beam directional speaker is in/mounted on a ceiling of a vehicle. In some embodiments, the system further comprises a memory coupled to the audio processor. In some embodiments, language data, pertaining to a plurality of languages, is stored on the memory.

BRIEF DESCRIPTION OF THE DRAWINGS

Features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
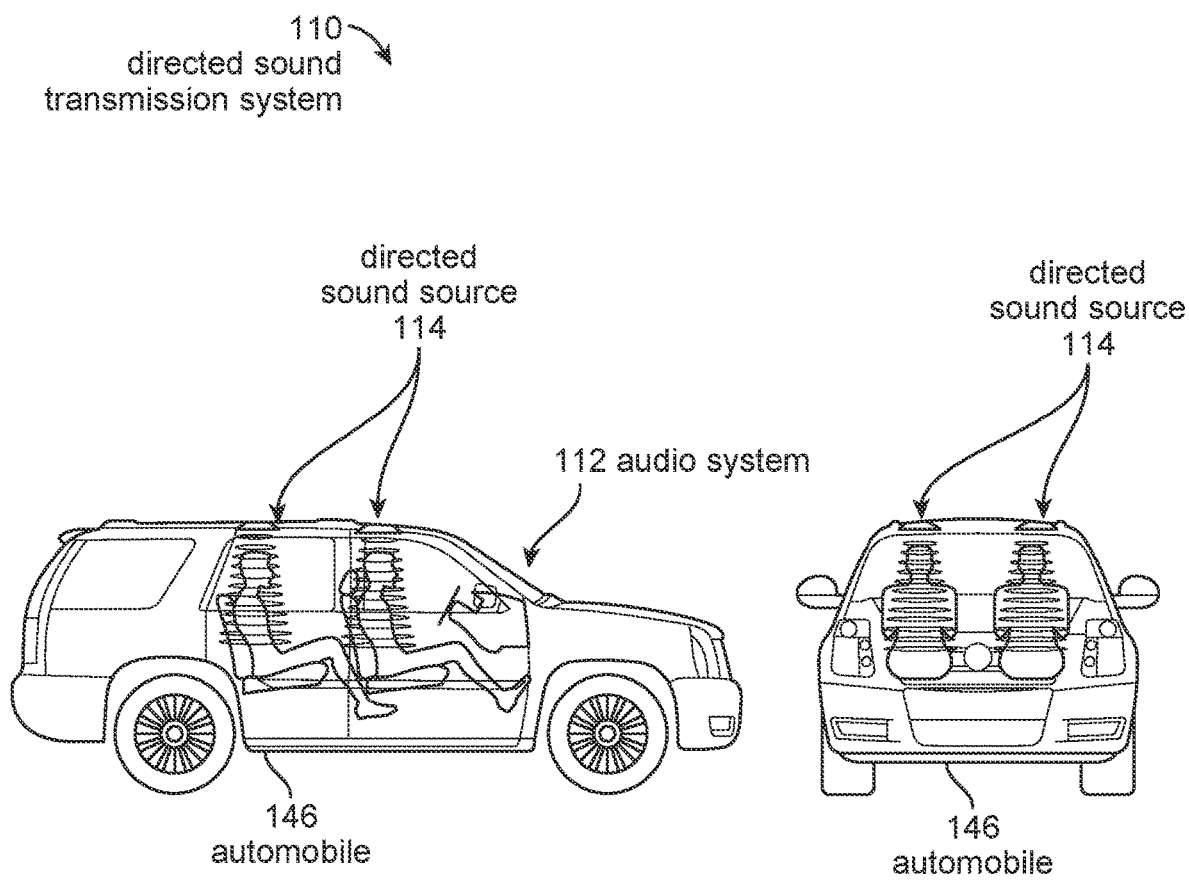
FIG. 1 illustrates a perspective view of directed audio in transportation vehicles, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. All such aspects or advantages are not necessarily achieved by any particular embodiment. For example, various embodiments may be carried out in a manner that achieves or optimizes one advantage or group of advantages as taught herein without necessarily achieving other aspects or advantages as may also be taught or suggested herein.

According to Global Market Insights, the automotive speaker market exceeds 5 billion USD and is expected to grow at a compound annual growth rate of 6.5% between 2020 and 2026. Specifically, sound systems connected to smartphones are expected to dominate the market share. Changes in the customer lifestyle to shift towards seamless connectivity is driving the market growth. With the growth of the Internet of Things and Artificial Intelligence, consumers expectations are changing. Customers are growing accustomed to controlling and customizing all aspects of their lives from their smart devices. The use of onboard infotainment systems in public transportation during day-to-day commuting to listen to music is greatly increasing. Ridesharing companies are expected to incorporate onboard infotainment systems into their services.

In addition, the global data analytics market is expected to increase with a compound annual growth rate of 6.01% from 2020 to 2025. Currently, North America holds the largest share in the global data market. However, Asia-Pacific is projected to be the fastest growing market. Data analytics companies process, enrich, and analyze data to then sell to other organizations to analyze consumers and determine their demands. Further, the global market for dash cams is projected to expand at a compound annual growth rate exceeding 15% from 2020 to 2027.

Consumers also want seamless integration of their smart devices within their homes, offices, and vehicles. With the existing technology, the only way to personalize audio content in a group setting is through headphone usage. Due to the inherent dangers, drivers are prohibited from wearing headphones in many states and countries, which leaves headphones as the only option for passengers to drown out unwanted sounds to the potential detriment of their hearing health. The use of headphones and noise levels can have negative effects on the health and well-being of users. The National Institutes of Health have found that five in ten young people listen to music too loudly, and 48 million people in the United States have trouble hearing (~15% of the US population).

Loudness is measured in a unit defined as decibels (dB). Noises that are above 85 dB may cause hearing loss over time by damaging ear fibers. The ear can repair itself if exposed to noise below a certain regeneration threshold, but once permanent damage occurs and one's hearing is gone, ear fibers cannot be fixed, nor can a person gain their hearing back. Some examples that employ a safe hearing range include whispering and normal conversations, which are around 30 dB and 60-80 dB, respectively. Unsafe zones include sporting events, rock concerts, and fireworks, which are around 94-110 dB, 95-115 dB, and 140-160 dB, respectively. Headphones fall into the range of 96-110 dB, placing them in the unsafe region. To give perspective, the ear should only be exposed to an intensity of 97 dB for about 3 hours per day, an intensity of 105 dB for about 1 hour per day, or an intensity of 110 dB for 30 minutes per day before causing ear damage.

As described, damage to the ear may occur when headphones deliver unsafe levels of sound directly to the ear canal. This damage is directly related to how much that sound makes your eardrum vibrate. When using speakers, sound waves have to travel a few feet before reaching the listener's ears. This distance allows some of the higher frequency waves to attenuate. With headphones, the eardrum will be excited by all frequencies without attenuation, so at the same volume, headphones can be more damaging than speakers. Additionally, when using headphones, many people are trying to produce acoustic isolation, which requires higher volumes to drown out ambient noise. For this reason, headphone audio levels should be chosen cautiously so as not to cause permanent ear damage and hearing loss.

In addition to hearing loss, headphones can cause a ringing in one or both ears, known as tinnitus, pain in the ear or ear drum. Other physical effects from headphone use include ear infections, characterized by swelling, reddening, and discharge in the ear canal, itching pain, and feelings of tenderness or fullness in the ear. Impacted wax (i.e., wax buildup) and aural hygiene problems may also result from headphone use, as they can create a potential for bacteria to form in the ear canal as a result of increases in temperature and humidity of the ear canal.

The market is in dire need of a solution to restore the tranquility of commuting and daily experiences by keeping audio content individualized with noise abatement courtesy to others, without requiring the use of headphones. The current state of the technology is mostly beneficial for conversation enhancement and directional driver notifications from the vehicle, but not focused on music or other audio input enhancement.

The present disclosure includes a parametric speaker system that revolutionizes how our connected devices interact with in-vehicle audio systems. The parametric speaker system decentralizes sound in order to allow users to customize their in-vehicle audio content seat-by-seat. Ultimately, the system provides simple, connected entertainment for everyone. In many embodiments, the system works by connecting to the vehicle audio system.

After the user downloads and accesses a mobile application, the user can select their seat and take control of the speaker system for that seat. The mobile application collects the user and environmental data and sends it back to servers via a mobile connection. A key advantage of this system is being agnostic to vehicle interfaces, meaning the system is adaptable and ready to plug and play across any platform. The system hardware is designed in such a way that its control software can be replaced by the automakers' OEM software, allowing full integration of the system features into the automakers' software build. In addition, the system may reduce acoustic clutter in the vehicle environment by allowing each passenger to listen to their own audio content in the form of audio books, movies, music, and phone calls as well as navigation and vehicle alerts.

FIG. 1 illustrates directed sound transmission system 110 which serves as an ultrasonic transducer that modulates audio information on an ultrasonic carrier. In some examples, directed sound transmission system 110 may serve as an apparatus for the directed transmission of sound waves restricted to a particular listener within a vehicle of transportation. As illustrated in FIG. 1, directed sound transmission system 110 may be located within automobile 146 and directed sound source 114. In some examples, at least one directed sound source 114 is installed in automobile 146 above and/or to the side of head 148 of listener 149, as shown in FIG. 1. Directed sound transmission system 110 may also include a mechanism (not shown), referenced herein as a low frequency generator, for generating low frequency sounds and vibrations (audio bass) located in seat base 150 and/or seat back 152 proximate the location of listener 149. It should be noted that although FIG. 1 shows an automobile, the application of directed sound waves via directed sound transmission system 110 applies to a wide range of autonomous and non-autonomous transportation vehicles including, but not limited to, automobiles, airplanes, trains, trolleys, buses, monorails and other forms of mass transportation.

Figure 2:
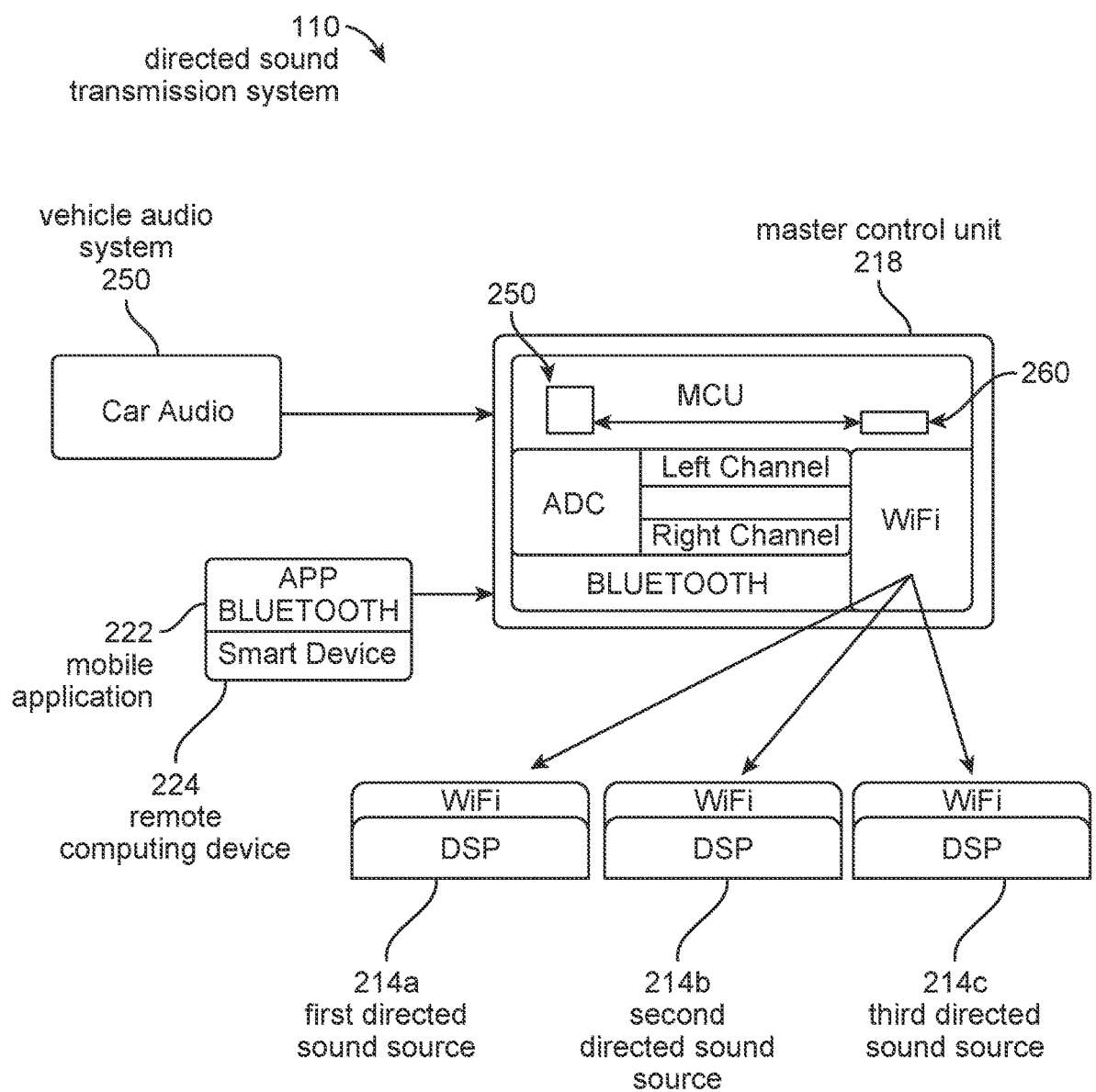
FIG. 2 illustrates a schematic view of directed audio in transportation vehicles, according to some embodiments.

FIG. 2 illustrates a schematic representation of directed sound transmission system 110 of FIG. 1. In some examples, directed sound transmission system 110 (FIG. 1) includes a vehicle audio system 250, a master control unit (MCU) 218, a remote computing device 224 including a mobile application 222, and at least one directed sound source 114. FIG. 2 shows that, in some examples, the at least one directed sound source 114 (FIG. 1) includes a first directed sound source 214a, a second directed sound source 214b, and a third directed sound source 214c.

In some examples, the MCU 218 comprises at least one processor 250 (e.g., an application processor) and at least one memory 260 having program instructions, that when executed by processor 250, are configured to cause directed sound transmission system 110 to direct sound as described herein. In some embodiments, memory 260 contains program instructions that, when executed by processor 250 (e.g., an open source processor such as, a 250 Linux™ processor), cause directed sound transmission system 110 (FIG. 1) to direct sound as described herein.

In some examples, MCU 218 exists locally on a hardware system that is programmed according to program instruction that is downloaded from remote server 268. In other examples, MCU 218 exists on a hardware system, located remotely elements of directed sound transmission system 110 according to program instruction downloaded from remote server 268.

In some examples, the MCU 218 is a music processor. In some examples, the music processor comprises at least a portion of an automobile audio system 212. In some examples, the automobile 146 (FIG. 1) is an autonomous vehicle. In some examples, the automobile 146 (FIG. 1) is a manual vehicle requiring a driver to operate said vehicle.

In many examples, the multiple directed sound sources 214a, 214b, and 214c are communicatively coupled to the MCU 218. The MCU 218 allows for the selection of a specific and different audio channel for each of the at least one directed sound source 214 connected to the MCU 218, thus personalizing the content of each audio sound source. The target listener controls the content selection of this sound source by using their remote computing device 224. Accordingly, directed sound transmission system 110 may include more than one remote computing device 224. In many examples, directed sound transmission system 110 includes one remote computing device 224 per listener. The remote computing device 24 may be configured to communicate with the MCU 218 via the mobile application 222 loaded on the remote computing device 224. In some examples, directed sound transmission system 110 (FIG. 1) contains a set of downloadable and installable software application, mobile application 222, designed for retail smart devices, such as a remote computing device 224 (which may be, for example, a smartphone or tablet). Mobile application 222 runs on MCU 218, providing functionality to control at least one of (not shown) a seat selection, content selection, and source speaker volume (i.e., the volume of the applicable directed sound source). Mobile application 222 may also identify a listener by a listener profile identification label (Profile ID). In some examples, usage data is collected and tagged with this Profile ID and stored in the cloud on remote server 268. The mobile application 222 may also provide firmware update functionality for the MCU 218 and the at least one directed sound source 214. MCU 218 can also initiate and override the chosen content for each sound source connected to it.

Figure 10:
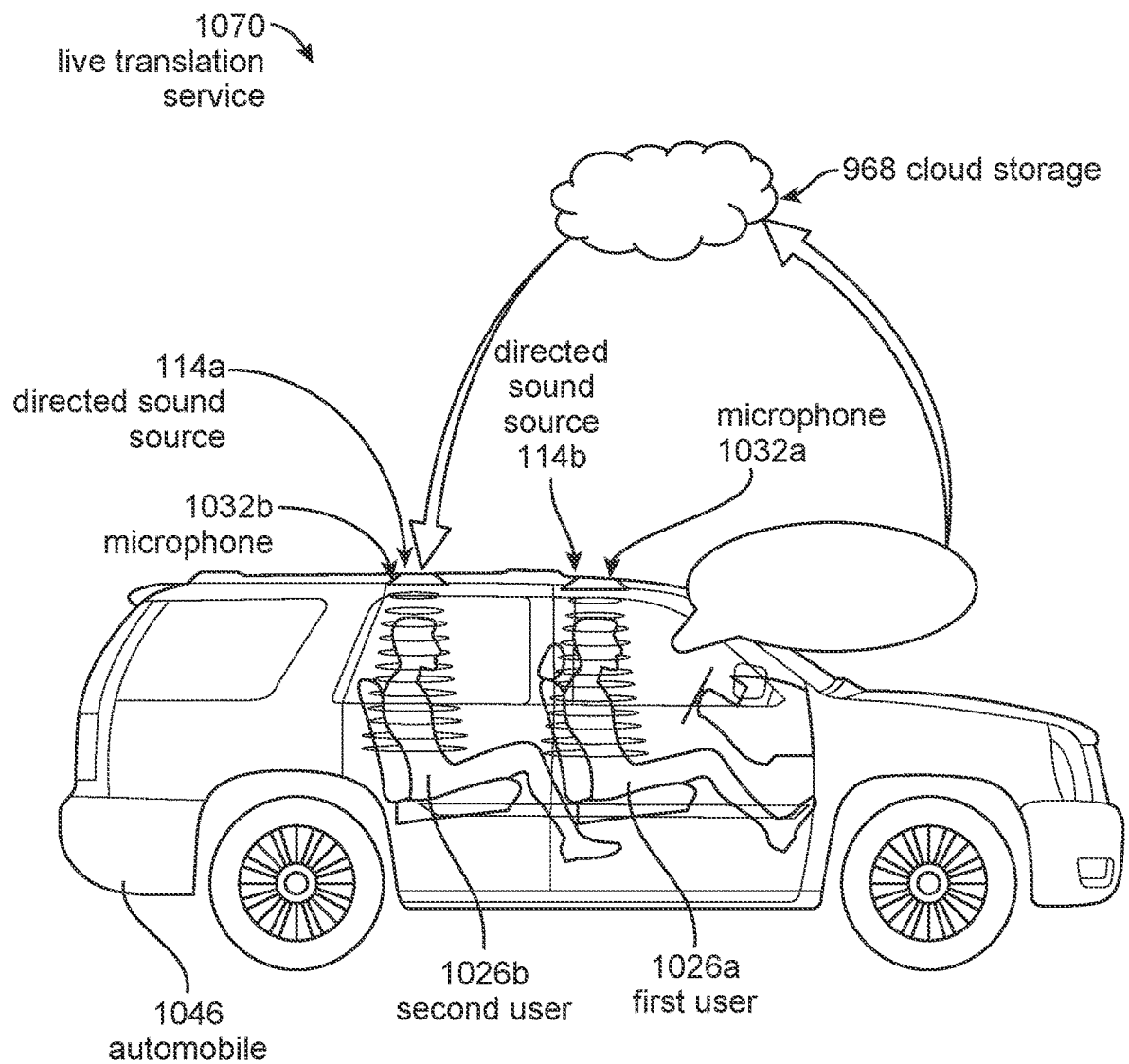
FIG. 10 illustrates a perspective view of a live translation service, according to some embodiments.

In some examples, MCU 218 comprises a programmable computational module capable of executing software code and various interface modules for communication with external devices, such as a remote computing device 224. The interface modules may include Wi-Fi, Bluetooth, and a control module that may be configured to interface with the vehicle systems, such as a vehicle audio system (not specifically shown). MCU 218 may also incorporate an accelerometer to measure the forces exerted during the operation of the automobile 1046 (FIG. 10).

Noise pollution is a major concern for venues that host weddings, corporate events, and celebrations. Event hosts and organizers often face a difficult choice between setting the desired acoustic atmosphere and respecting the noise level neighboring homes and businesses experience. Noise pollution is a particularly prevalent concern for short-term rental properties, such as AirBnB. One of the biggest complaints of neighbors to AirBnB (and VRBO, etc.) hosts is disrespectful music volume. When staying in short-term rentals, such as a hotel or Airbnb, consumers want all the amenities of home with none of the responsibilities. Travelers generally fall into two distinct groups: businesspeople and vacationers. A vacationer should be able to let loose and play music in their room. However, this can interrupt the quiet focus time of business travelers. Installing directed sound transmission system 110 (FIG. 1) in short-term rentals can allow all guests to coexist harmoniously as if they were in their own individual homes. Further, installation of directed sound transmission system 110 (FIG. 1) into these environments would allow guests to have their ideal experience and keep it isolated from the outside world.

Figure 3:
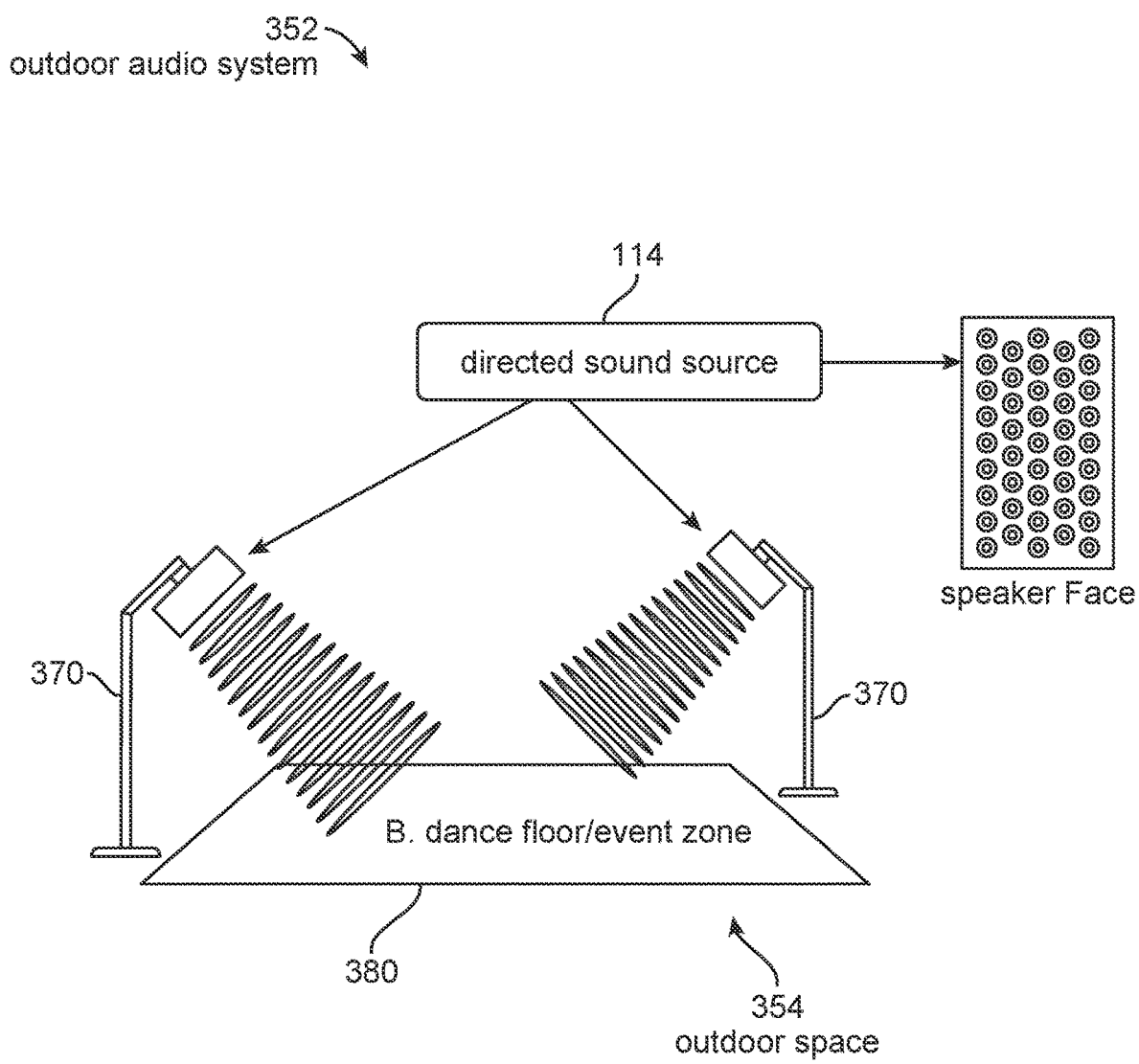
FIG. 3 illustrates a perspective view of sound abatement in an outdoor space, according to some embodiments.

FIG. 3 illustrates a perspective view of outdoor audio system 352 in use in outdoor space 354. In some examples, outdoor audio system 352 may be representative of directed sound transmission system 110 (FIG. 1) and may provide transmission of sound waves within a confined location directed and restricted to a particular group of listeners. Stated differently, outdoor audio system 352 may be considered a noise abatement system. As illustrated in FIG. 3, outdoor audio system 352 includes at least one directed sound source 114, which may be installed a few feet above the listener's head (not shown). Outdoor audio system 352, mounted on pole 370, as demonstrated in FIG. 3. Outdoor audio system 352 may also include a mechanism (not shown) to generate low frequency sounds and vibrations (audio bass) located in floor 380 below a listeners' feet (not shown) in outdoor space 354.

Figure 4:
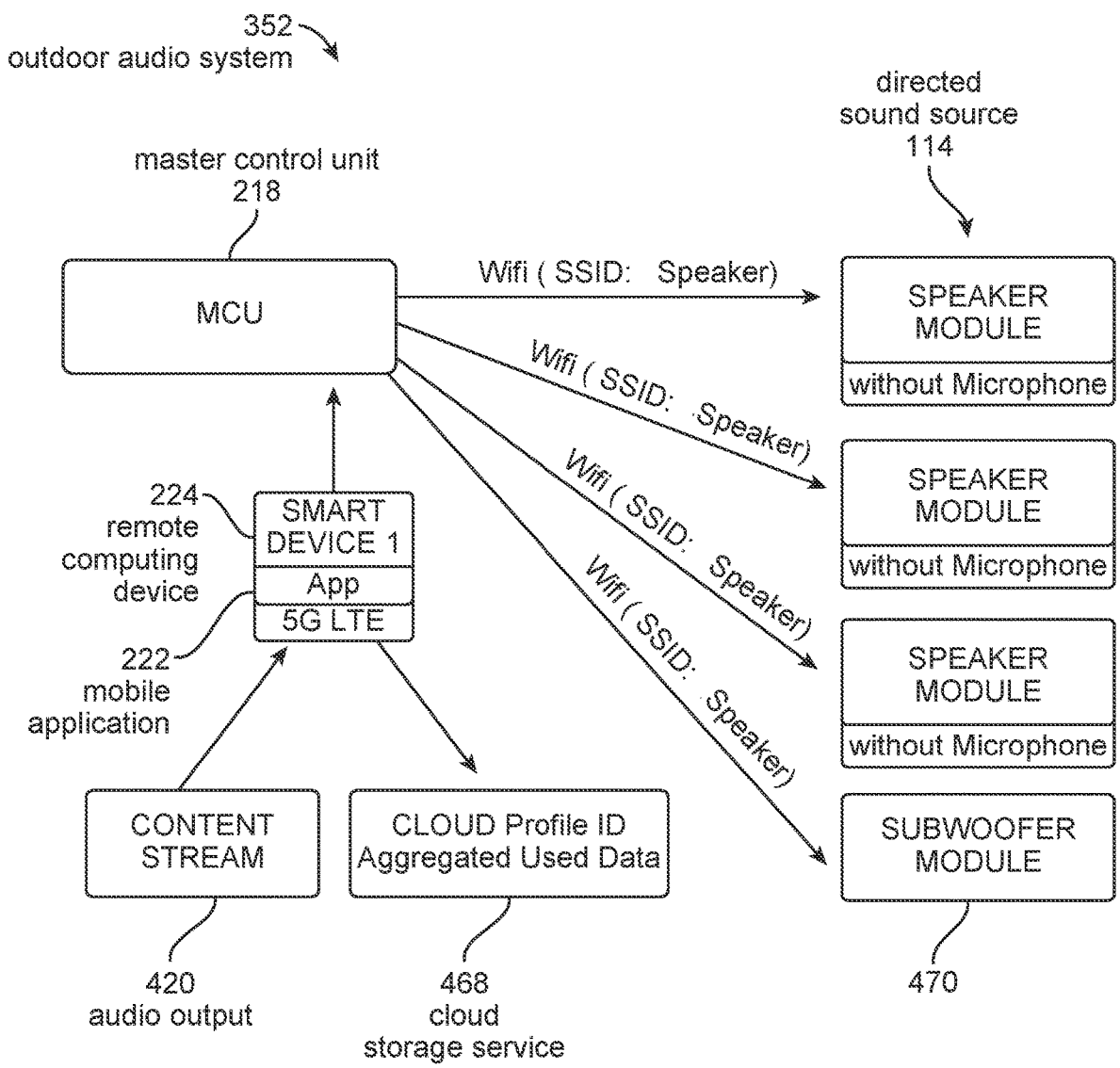
FIG. 4 illustrates a schematic view of sound abatement in an outdoor space, according to some embodiments.

FIG. 4 illustrates a block diagram of a sound system including noise abatement. As shown in FIG. 4, and as discussed with reference to directed sound transmission system 110, outdoor audio system 352 may include MCU 218 communicatively coupled to directed sound source 114, and a remote computing device 224 including mobile application 222. In some examples, outdoor audio system 352 contains a set of downloadable and installable software applications, mobile application 222, for use with retail smart devices, such as a remote computing device 224, which may be, for example, a smartphone or tablet. Mobile application 222, executed on MCU 218, provides functionality to control at least one of (not shown) a content selection and a source speaker volume (i.e., the volume of the applicable directed sound source). Mobile application 222 may also identify the listener by Profile ID. In some examples, usage data is collected and tagged via Profile ID and stored on the cloud in remote server 268. Mobile application 222 may also provide firmware update functionality for MCU 218 and directed sound source 114. In some examples, MCU 218 executes software for communication with external devices, such as a remote computing device 224 via a wireless such as Wi-Fi or Bluetooth Outdoor audio system 352 may include a content stream (audio output 20) that is "fed" through remote computing device 224 to MCU 218. In addition to directed sound source 114, MCU 218 may be operatively coupled to subwoofer module 470. The sound abatement system in particular and examples described herein may make use of Gaussian white noise as generated by a Gaussian noise generator (not shown) or as implemented within MCU 218. Alternatively, the sound abatement system and examples described herein may make use of a noise cancellation system as provided by as a separate system or as implemented within MCU 218.

Outdoor audio system 352 may provide directed sound transmission by a modulating an ultrasonic carrier with sound. In connection with the modulated carrier striking a physical object such as the listener's head and ears, it demodulates, leaving audible sound for the listener to hear.

The foregoing describes the delivery of sound herein in connection with directed sound transmission system 110 as described throughout.

Figure 5:
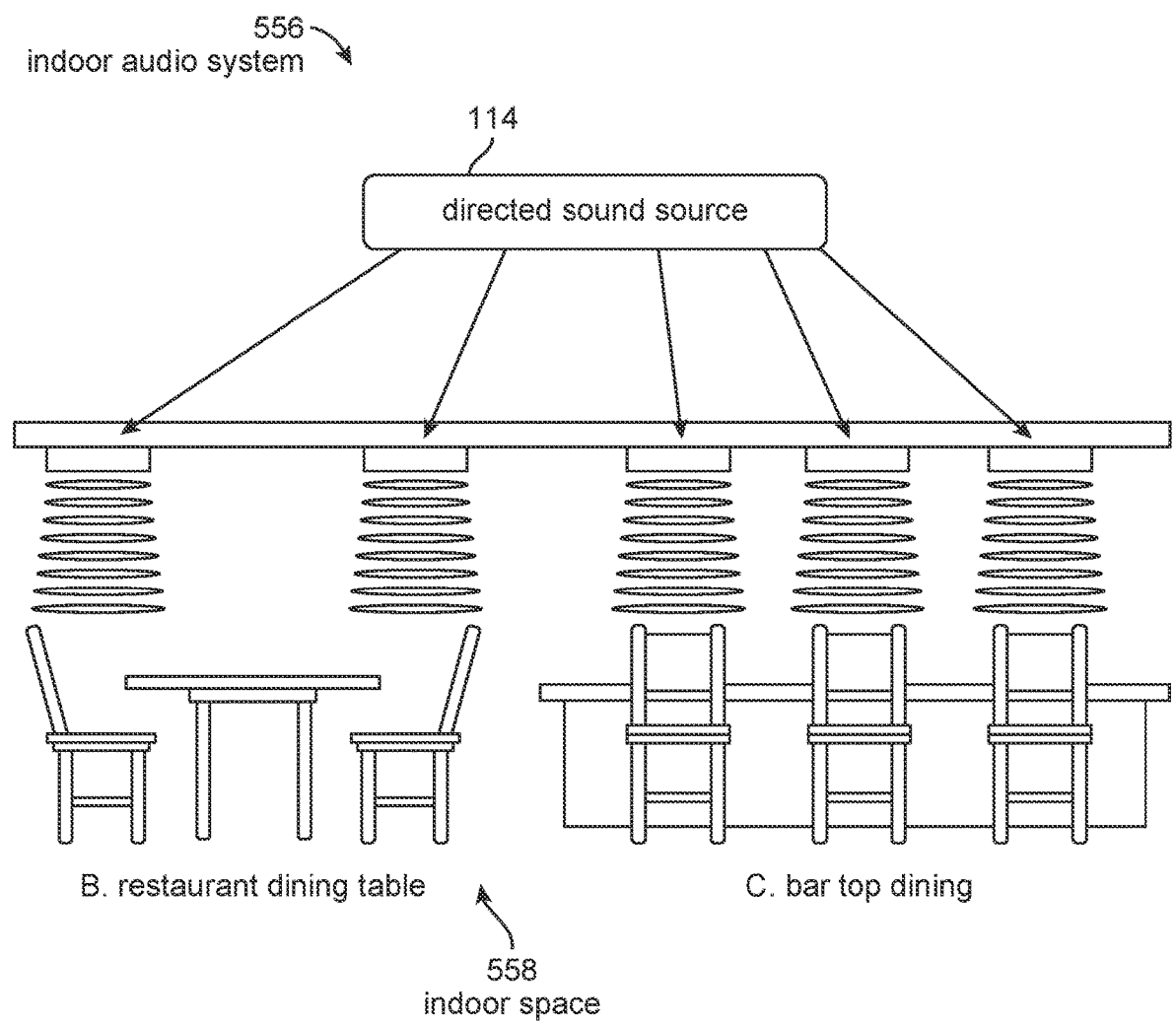
FIGS. 5 and 6 illustrate perspective views of sound abatement in an indoor space, according to some embodiments.

FIG. 5 illustrates a perspective view of indoor audio system 556, operating in indoor space 558, which is similar to outdoor audio system 352 of FIG. 3. In some examples, indoor space 558 includes a restaurant and/or bar setting. Indoor audio system 556 may be to direct transmission of sound waves to a particular listener or group of listeners within restaurants and bars. As shown in FIG. 5, indoor audio system 556 may include directed sound source 114 installed above and/or to the side of the listeners' head.

Providing directed sound source 114 in restaurants may enable consumers to customize their own music/audio at a booth and set the mood to which they desire. Additionally, by directing noise conditioning through indoor audio system 556, patrons may have the ability to have a quiet meal or party on the dance floor within the same bar.

Establishments like Sports Bars and Restaurants are known for entertaining patrons with multiple media options to enhance the overall experience. Many bars and restaurants have multiple TVs spread across the space, all showing different media. Typically, there is a single output audio source coming from a "master TV." Indoor audio system 556 may provide seat-by-seat audio (via directed sound source 114) and source (tv) connectivity for each individual TV input. In some embodiments, a Quick Response (QR) code will prompt a user to download mobile application 222 on their remote computing device 224 and show the user how the system functions enabling the user to choose whichever input they prefer. Additional inputs may be integrated, such as jukebox libraries that can play seat by seat, or table by table. Mobile application 222 allows for the collection of data on what users are streaming seat by seat through the connection to directed sound source 114. In addition, indoor audio system 556 may allow patrons to order food and drinks vocally and avoid touching high trafficked table side ordering devices, thus enabling patrons to engage in the increasingly popular practice of contactless dining/ordering.

Indoor audio system 556 may also give retailers the unique opportunity to provide product placement voice information in close proximity to (or near) their displays. Having employees push the same product information or specials to everyone who enters the store is not only repetitive and draining to the employee, but disruptive to everyone's shopping experience. With targeted placement of indoor audio system 556 in various locations around a store, customers can get individualized notifications, leaving sales associates with the bandwidth to support customer needs.

Exhibitions and conferences tend to have boisterous, exciting atmospheres. Every business, company, or entrepreneur is trying to grab and hold your attention. However, with multiple speaker systems going, it becomes hard to focus on any one exhibit. Introducing indoor audio system 556 to this environment will allow exhibits to set the mood for their individual presentation without distracting from others.

Figure 6:
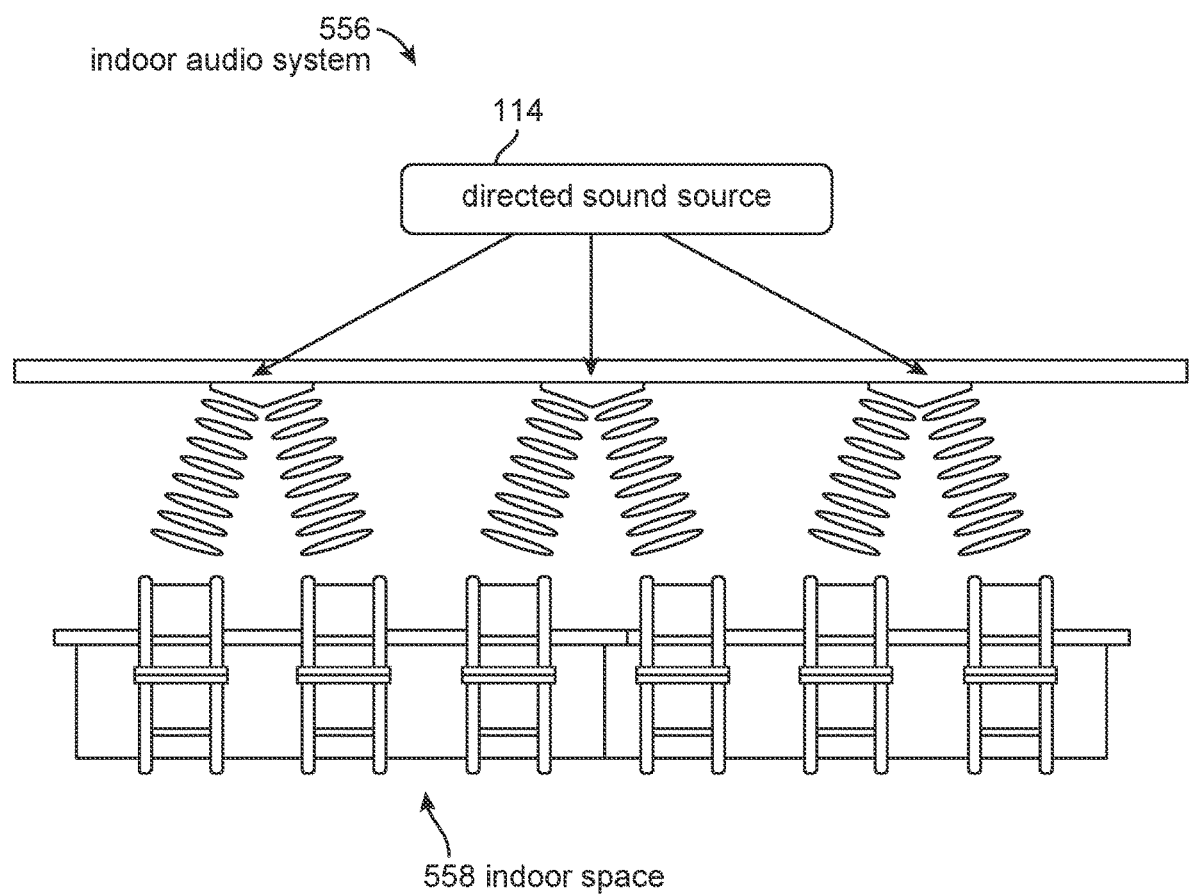

FIG. 6 illustrates a perspective view of another example of indoor audio system 556. FIG. 6 shows an installation point is the ceiling above a bar, as shown in FIG. 6, or the ceiling above a wider area including a bar and table seating, as shown in FIG. 5. Indoor audio system 556 may also include a mechanism to generate low frequency sounds and vibrations (audio bass) located in the seat base and/or seat back at the listener's location. In some embodiments, indoor audio system 556 also includes CU 218 (FIG. 4) communicatively coupled to remote computing device 224 (FIG. 4), which allows a user to control content selection. MCU 218 (FIG. 4) may also be communicatively coupled to directed sound source 114. Allowing for control of content selection may include allowing each user to select a specific and different audio channel for each directed sound source 114, thereby personalizing the content of each directed sound source for a user or group of users.

In some embodiments, indoor audio system 556 contains a set of downloadable and installable software applications, mobile application 222 (FIG. 4), designed for retail smart devices, such as remote computing device 224 (FIG. 4), which may be, for example, a smartphone or tablet. Mobile application 222 (FIG. 4) through MCU 218 (FIG. 4) provides functionality to control at least one of content selection and source speaker volume (i.e., the volume of the applicable directed sound source). Mobile application 222 (FIG. 4) may also be configured to identify a listener by Profile ID. In some examples, usage data is collected and tagged with a Profile ID and stored by via cloud storage.

Figure 7:
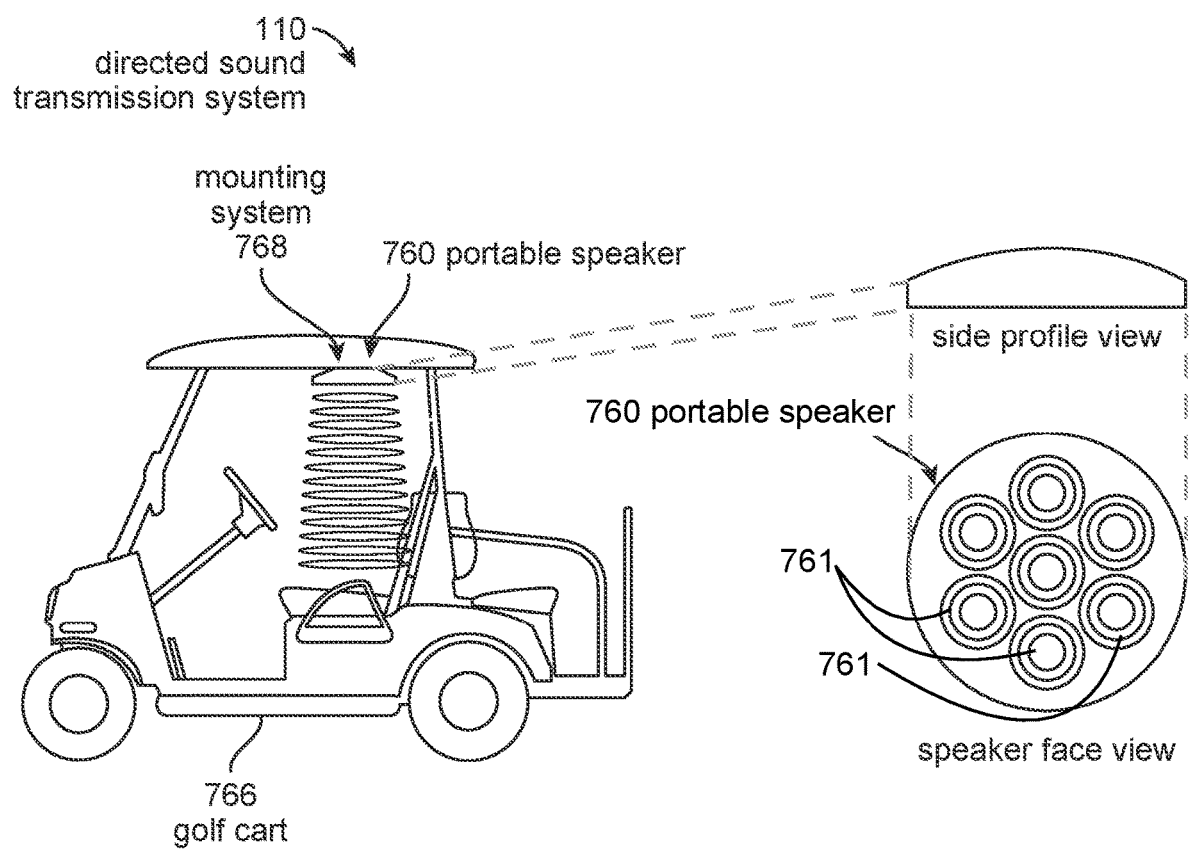
FIG. 7 illustrates a perspective view of a portable speaker system, according to some embodiments.

FIG. 7 illustrates an embodiment of directed sound transmission system 110 including a portable speaker system 760 having one or more portable individual speakers 761 providing directed sound as described herein. Using at least one portable speaker 761, providing directed sound, may allow users to listen to audio of their choosing without disturbing others. Portable speaker system 760 may be especially desirable for outdoor activities like camping, hiking, golfing, skiing, picnics, trips to the beach, and the like.

Portable speaker system 760 may be considered an apparatus for the transmission of sound waves, within a confined location, directed and restricted to a particular listener or group of listeners. In some examples, as demonstrated in FIG. 7, portable speaker system 760 may be coupled to a golf cart 766 via a mounting system 768. It should be noted that the golf cart 766 is used as only one example, and portable speaker system 760 may be configured to couple to any number of off-highway vehicles, including snow mobiles, all-terrain vehicles (ATVs), bicycles, boats, and the like. In addition, portable speaker system 760 may be carried, such as in a purse, backpack, golf bag, or the like, without using mounting system 768 to couple portable speaker system 760. As shown in FIG. 7, portable speaker system 760 may be installed a few feet above a listener's head. The portable speaker system may also include a mechanism to generate low frequency sounds and vibrations (audio bass) located in the seat or below the listeners' feet at the same location.

In some examples, a portable speaker system may include a set of downloadable and installable software application, (mobile application 222 of FIG. 2), designed for retail smart devices, such a remote computing device 224 (FIG. 2), which may be, for example, a smartphone or tablet. This software communicates with the MCU 218 (FIG. 2) and provides the functionality to control at least one of content selection and source speaker volume (i.e., the volume of the applicable directed sound source). Mobile application 222 (FIG. 2) may also be configured to identify the listener by Profile ID. In some examples, usage data is collected and tagged with this Profile ID and stored in the cloud storage at a remote server (not shown). Mobile application 222 (FIG. 2) may also provide firmware update functionality for MCU 218 (FIG. 2) and directed sound source 114 (FIG. 2).

Recently, workplaces have been trending towards an open office concept. While an open-concept office space may increase collaboration, worker focus and productivity may decrease for some people. Many workers are turning to wearing noise canceling headphones for 40 hours a week, which is not only uncomfortable but potentially harmful to long term hearing. Integrating directed sound transmission system 110 into the workplace may allow individual workers to only hear their own phone calls, meetings, and music, thus reducing distractions to coworkers.

Directed sound transmission system 110 may be even more relevant to the workforce now with many office workers working from home. While offices were built with noise isolation between coworkers in mind, most homes and apartments were not. Having two or more people working from home creates a lot of extra hassle to ensure both parties can hold simultaneous business conversations. The individual sound zones of the present invention may greatly alleviate this pain. With the new work-from-home and learn-from-home culture, directed sound transmission system 110 may have a profound effect on online learning, Zoom™ calls, gaming, and home theaters.

Figure 8:
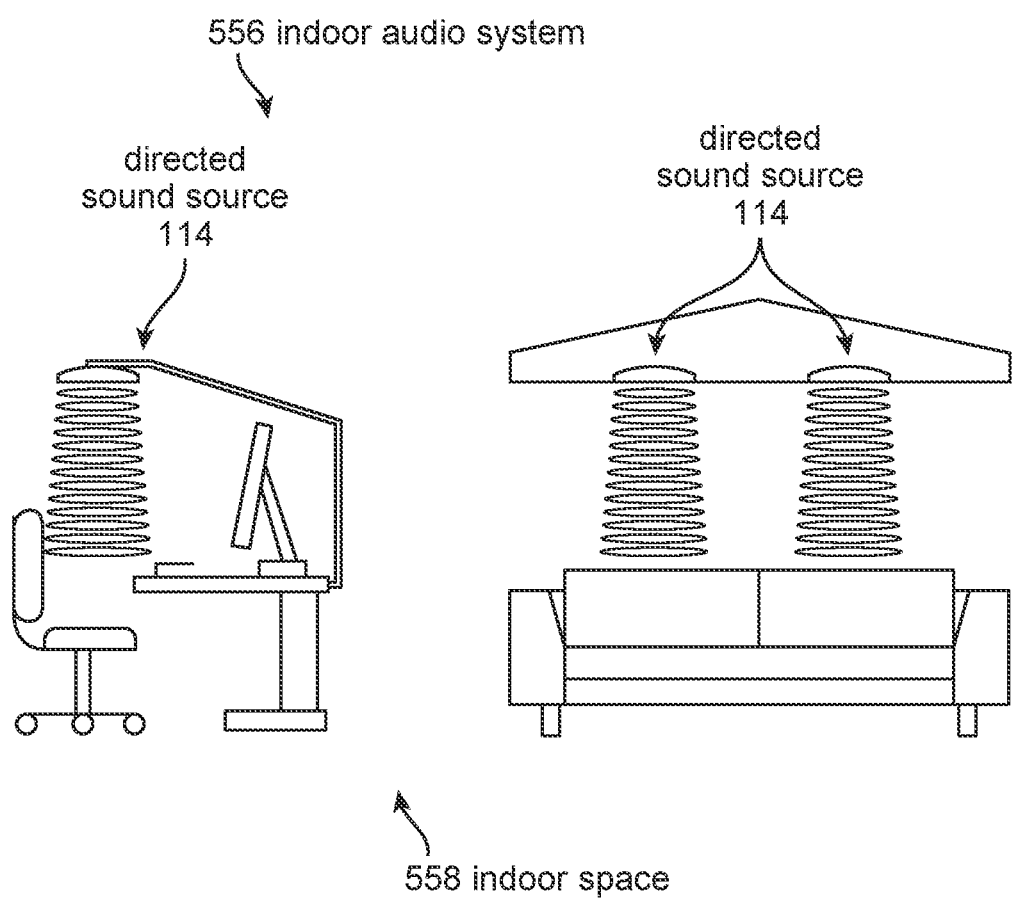
FIG. 8 illustrates a perspective view of a home speaker system, according to some embodiments.

FIG. 8 illustrates a perspective view of another example of directed sound transmission system 110 including indoor audio system 556, which is represented in FIG. 8 as a home speaker system. Indoor audio system 556 may direct the transmission of sound waves to a particular listener or group of listeners. As shown in FIG. 8, indoor audio system 556 may include directed sound source 114 installed above and/or to the side of each listeners' head. One example of an installation location for indoor audio system 556 is a ceiling above a couch, or over a desk, as shown in FIG. 8. Indoor audio system 556 may further include a mechanism to generate low frequency sounds and vibrations (audio bass) located in the seat base and/or seat back at the listener's location. Indoor audio system 556 may be configured to communicatively couple to MCU 218 (FIG. 4), which may operatively couple to remote computing device 224 (FIG. 4).

In some examples, indoor audio system 556 may contain a set of downloadable and installable software applications, mobile application 222 (FIG. 4), and designed-for retail smart devices, such as a remote computing device 224 (FIG. 4). Mobile application 222 (FIG. 4) may provide the functionality to control content selection and source speaker volume of content from directed sound source 114. Mobile application 222 (FIG. 4) may also be configured to identify a listener by Profile ID. In some examples, usage data is collected and tagged with a Profile ID and stored in a cloud server (not shown).

Figure 9:
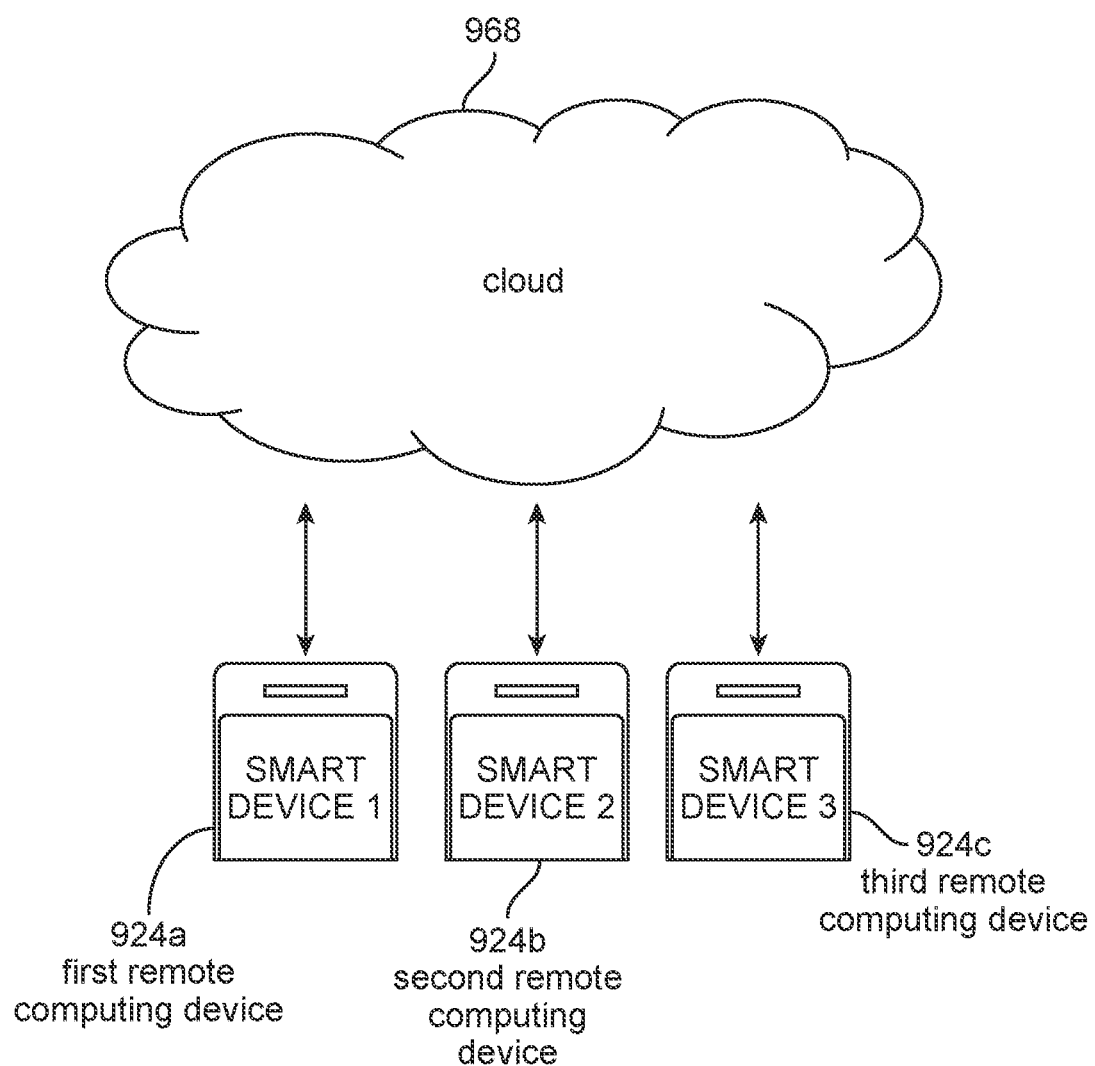
FIG. 9 illustrates a schematic view of a cloud storage service, according to some embodiments.

FIG. 9 is a diagram that illustrates the collection of user data being placed in cloud storage. Directed sound transmission system 110 may be configured to collect user data. The data may include automotive location and acceleration data, as well as data related to a user's social surroundings. In some examples, directed sound transmission system 110 can generate large pools of grouped and sorted data as part of the connected experience. For example, decentralizing the in-vehicle audio experience encourages all passengers to utilize their devices at the same time, thus providing numerous sources of data. As shown in FIG. 9, such may be indicated in connection with first remote computing device 924a, second remote computing device 924b, and third remote computing device 924c communicatively coupled to cloud 968 for storage.

In addition to building consumer profiles for marketing purposes, the data collected from directed sound transmission system 110 may be used in risk mitigation and research. Specifically, insurance companies may be interested in this data to determine premiums, and researchers may use this data to improve products and advance technologies. Some of the types of data collected may include, but are not limited to, external road and environmental conditions, technical status of a vehicle, vehicle usage (speed, location, average load weight), personal data and preferences (driver identity, preferred radio stations), and tier health data.

Some examples of the functions and services provided by cloud 968 include user profile management (Profile ID), aggregated usage data indexing and storage, live translation, system firmware management, original content, and customer billing services. It should be noted that the functions and services are not limited to those stated in this disclosure.

International business is very prevalent, and the at least one directed sound source 114 may be useful for live translation in business meetings. Directed sound transmission system 110 may obtain live translation technology and outfit conference rooms with parametric speakers, such as directed sound source 114, and microphones so everyone in the meeting can speak and listen to the meeting in their native language. This may be especially useful for those that have difficulty speaking a certain language or for those that cannot quite understand another person as a result of language barriers.

Directed sound transmission system 110 may also be configured for auditory kiosk communication and live translation. While kiosks are plentiful in malls, they may also be found in airports and train/bus stations. Kiosk auditory communication can also enrich the lives of those more local by replacing noisy self-service stations in banks, grocery stores, and medical offices. Further, directed sound transmission system 110, through its incorporated auto speakers and microphone arrays, and software may allow for "Live Translation" of conversations (speaking & listening) between rideshare/taxi drivers and passengers speaking different languages.

FIG. 10 is a cutaway/perspective drawing showing live translation service 1070 employed within automobile 1046. In some embodiments, live translation service 1070 includes two or more directional sound emitters with built-in microphones, such as directed sound source 114 with integrated microphone 1032, placed in physically separate locations. Live translation service 1070 may be coupled to and controlled by a controller (not shown). Microphone 1032 may be used to supply audio information for modulation in connection with directed sound source 114. Red, green and blue (RGB) lights may be used over seats in a seating arrangement within a vehicle to signal the transmission or reception of an intended communication from directed sound transmission system 110.

Figure 11:
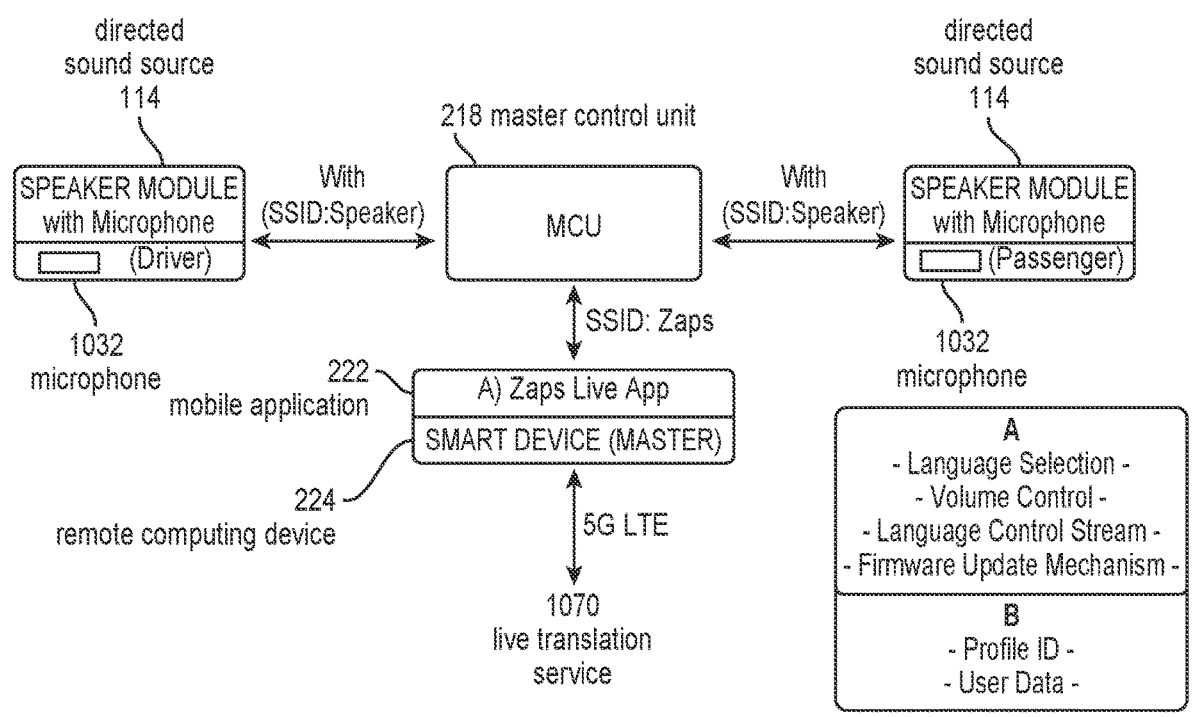
FIG. 11 illustrates a schematic view of a live translation service, according to some embodiments.

FIG. 11 illustrates a block diagram of the live translation system. Audio information may be collected by microphone 1032. The audio information may then be continuously streamed to the MCU 218 coupled to mobile application 222 loaded on remote computing device 224. Mobile application 222 causes audio information to be sent to Live Translation service 1070 (running, for instance in cloud 968) which may identify spoken words, analyze meanings, and translate a language into a recipient's natural language. This translation may be streamed to a recipient's directional sound emitter module pointing to the target person, again via the mobile application 222 and MCU 218. In some examples, the same process occurs in reverse from the recipient back to the sender. Thus, the conversation between the sender and recipient is translated between the sender's natural language and the recipient's natural language and back again in real time. It should be noted that the "sender" may be considered the first user 1026a shown in FIG. 10, and that the "recipient" may be considered the second user 1026b shown in FIG. 10. It should also be noted that though FIG. 10 labels directed sound source 214 above the second user 1026b and microphone 1032 above the first user 1026a, there may be two directed sound sources, both containing a microphone 1032, located above both respective first and second users (1026a, 1026b).

With reference again to FIG. 11, mobile application 222 controls the language selection and speaker volume for both the sender and recipient sides of a conversation. Mobile application 222 may also pass the profile ID of a sender's mobile application 222 to Live Translation service 1070. Thereafter, Live Translation service 1070 may have access to a conversation transcript identified by a profile ID. This data may be stored for later use. Mobile application 222 may also provide the firmware update functionality for MCU 218 and directed sound source 114.

Figure 12:
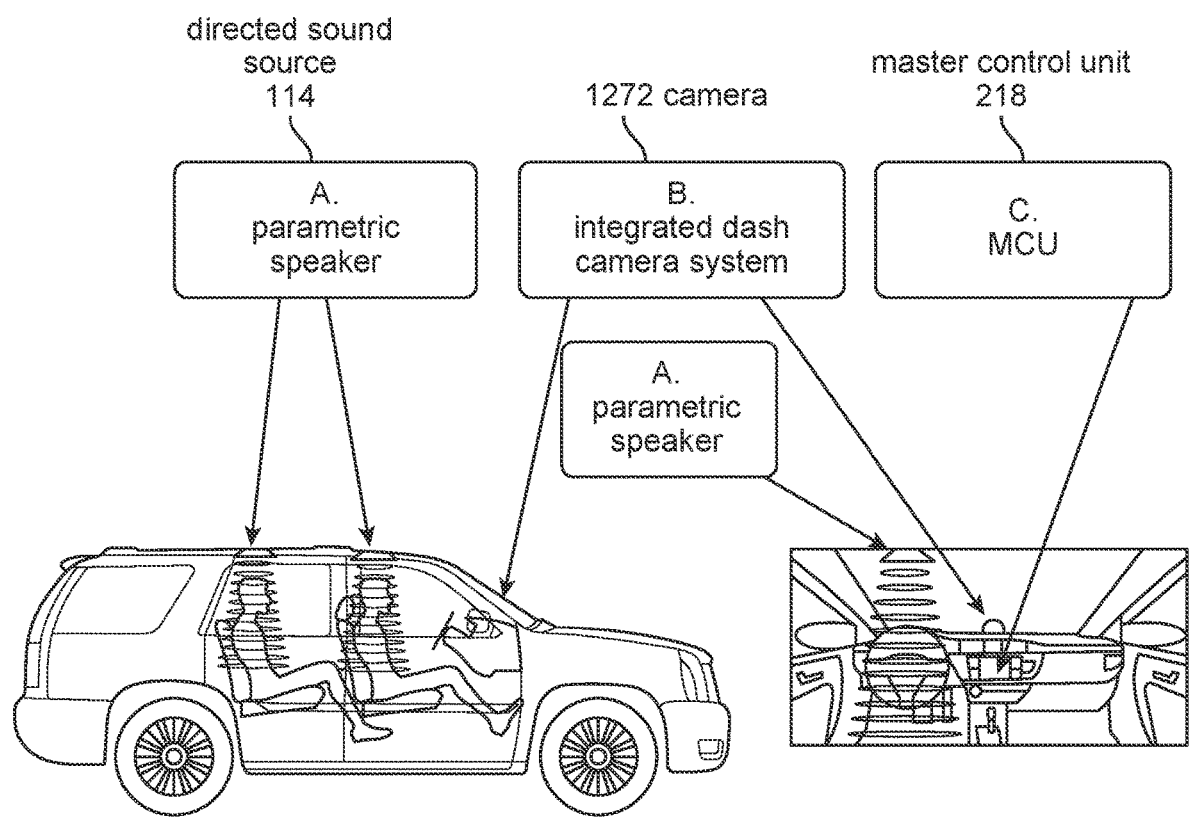
FIG. 12 illustrates a perspective view of optical access in a transportation vehicle, according to some embodiments.

FIG. 12 shows a perspective view of an optical integration system which may be operable with directed sound transmission system 110 in a transportation vehicle. In some examples, optical access may be incorporated within the directed sound transmission system 110, including MCU 218 connected to directed sound source 114. In some embodiments, directed sound transmission system 110 provides directed sound through a source installed in the vehicle above and/or to the side of a driver's head, to allow only the driver and not the passengers will hear information intended for the driver. Directed sound transmission system 110 may also include a mechanism to generate low frequency sounds and vibrations (audio bass) located in the seat base and/or seat back at a listener's location. This mechanism is referred to as a low frequency generator. It should be noted that although FIG. 12 shows an automobile, the application of directed sound waves via directed sound transmission system 110 applies to a wide range of autonomous and non-autonomous transportation vehicles including, but not limited to, automobiles, airplanes, trains, trolleys, buses, monorails and other forms of mass transportation.

In some examples, directed sound transmission system 110 contains a set of downloadable and installable software applications, and designed-for retail smart devices, such as a remote computing device (not shown) which may be, for example, a smartphone or tablet. The software applications run on MCU 218 and provide the functionality to select which key alerts and notifications from a vehicle's enhanced safety systems (vehicle condition, collision prevention, lane assist, and the like) are relayed to the driver's directed sound source, as well as source speaker volume (i.e., the volume of the applicable directed sound source). A software application (not shown) may be used to identify a listener by Profile ID. In some examples, usage data is collected and tagged via Profile ID and stored in cloud 968. Software applications (not shown) may also provide firmware update functionality for MCU 218 and the at least one directed sound source 114.

In some examples, MCU 218 comprises a programmable computational module capable of executing software code and various interface modules (not shown) for communication with external devices, such as a remote computing device (not shown). The interface modules may include Wi-Fi, Bluetooth, and a control module (not shown) that may be configured to interface with the vehicle systems, such as the vehicle safety systems. MCU 218 may also incorporate an accelerometer to measure the forces exerted during the operation of a transportation vehicle (or other transportation device comprising directed sound transmission system 110, if applicable).

Figure 13:
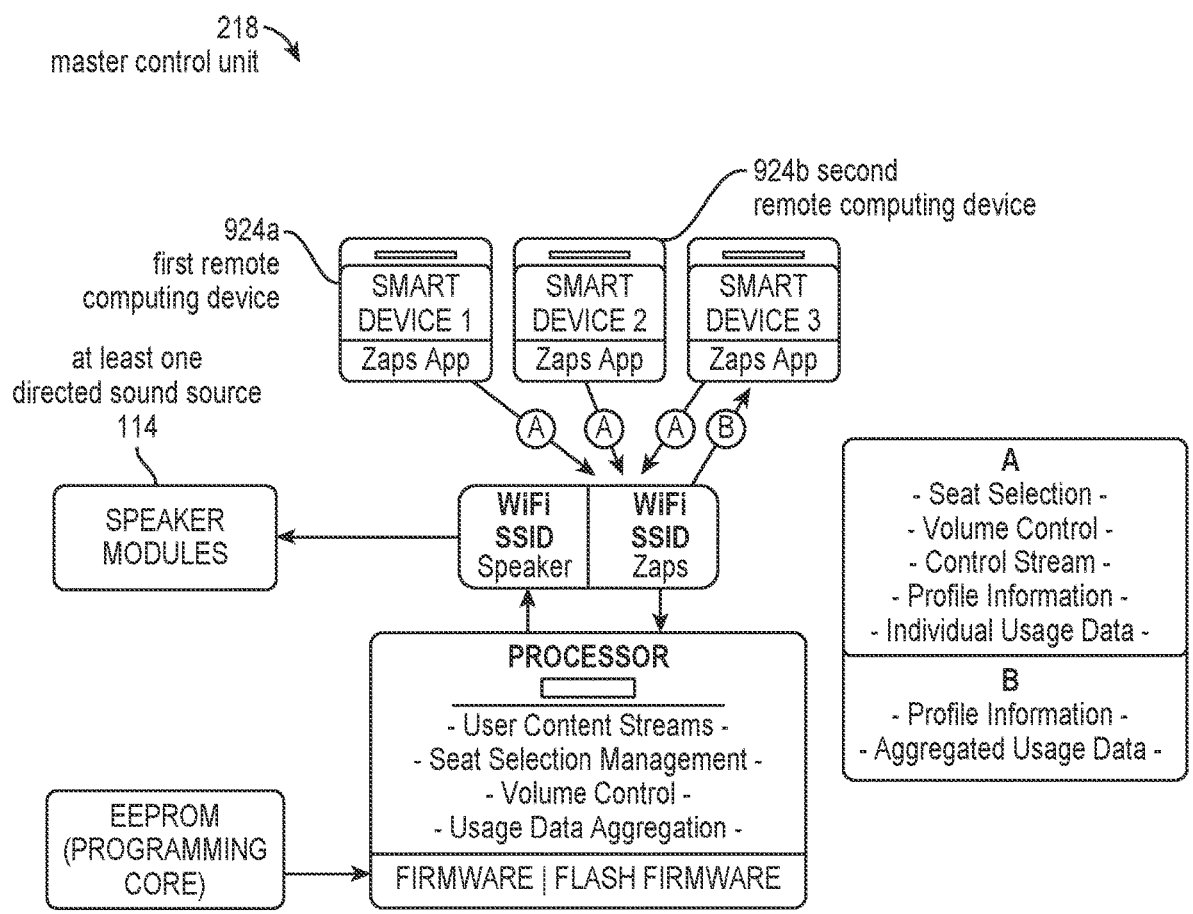
FIG. 13 illustrates a component diagram of a master control unit, according to some embodiments.
Figure 14:
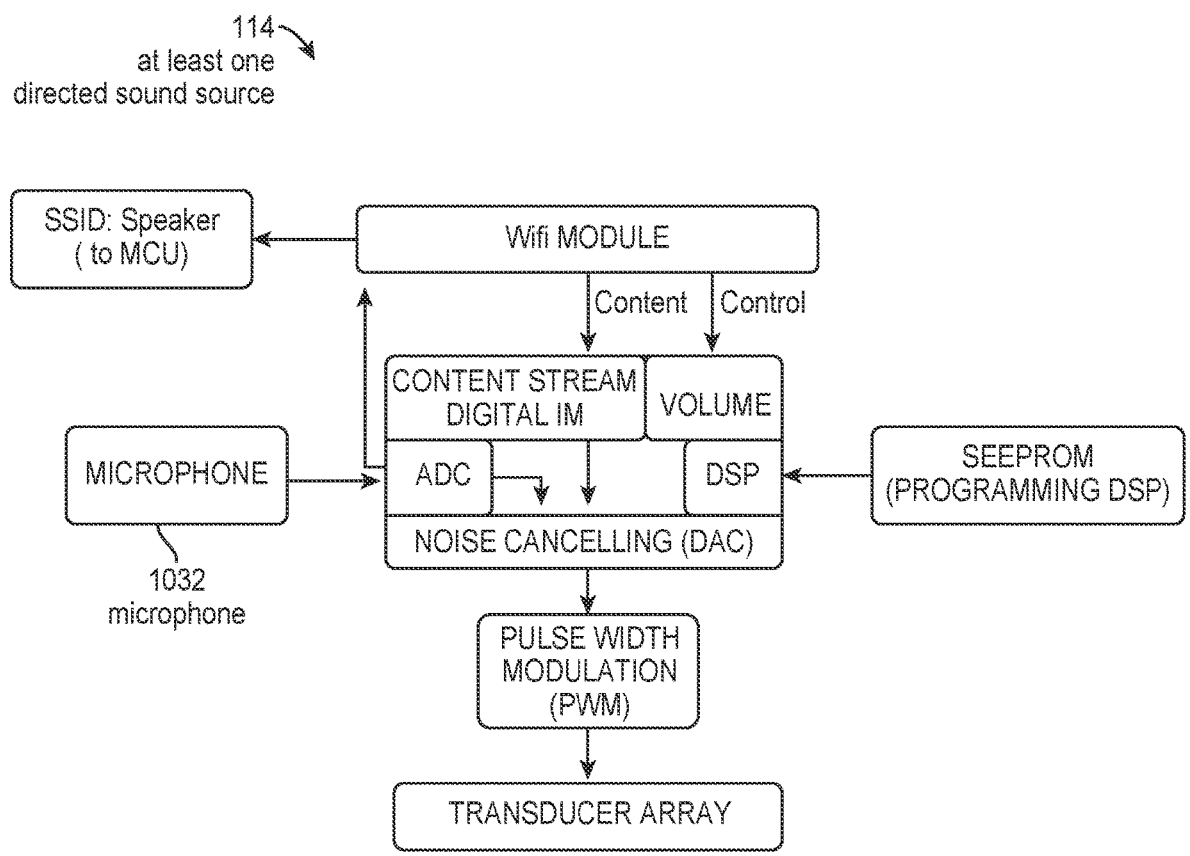
FIG. 14 illustrates a component diagram of at least one directed sound source, according to some embodiments.

FIGS. 13 and 14 illustrate block diagrams including MCU 218 and directed sound source 114, respectively. FIG. 14 also details communication between MCU 218 and other elements of directed sound transmission system 110, such as directed sound source 114 and first remote computing device 924a, second remote computing device 924b, and third remote computing device 924c. FIG. 14 also show that directed sound source 114 may include a WiFi module, a microphone 1032, and a noise cancelling element, among other components. It should be noted that neither the MCU 218 (FIG. 13), nor the at least one directed sound source 114 are limited to the elements shown in the figures and may include additional components not shown or described in this disclosure.

Directed sound transmission system 110 may also be useful in contexts not previously discussed in this disclosure, including public transit platforms, museums, and ride-hailing services. Repeated reminders on public transit platforms exist to warn waiting passengers to stay behind the indicated line until the train comes to a complete stop. Often, these reminders or alarms can cause annoyance and discontent, while contributing to the noise pollution of the area. Use of directed sound source 114 may have the potential to limit sound to only the space between train tracks and an indicated train line. Additionally, a higher frequency emitted from a speaker may cause passengers to want to leave an area, keeping them at a safe distance from high-risk areas. Furthermore, this concept may also be used to reduce risks on manufacturing floors keeping workers out of dangerous areas such as designated locations at, for instance, a shooting range.

Coupled with motion sensors, directed sound transmission system 110 may play an audio selection when approached by a consumer. At museums, this could eliminate the use of headphones on guided tours. Instead of trying to figure out which exhibit the speaker is discussing, a consumer can be spoken to, directly, at an exhibit without others being disturbed in connection with a mobile application and/or fob that allows a user to choose language preferences during a tour. In some examples, a mobile application and/or a remote computing device may allow for the collection of additional sellable data.

In a ride-hailing context, a driver may listen to audio of his/her choosing while letting passengers choose their own music. This creates a more enjoyable experience for the passenger and could lead to better rating, reviews, and tips for the driver. For the ride-hailing companies, zoned audio may act as a market differentiator should the technology detailed herein be installed in a fleet. It is further contemplated that functionality could be added to a controlling app that allows selection or creation of a playlist for a ride. Taxi companies may also benefit from the foregoing technology.

In addition to reducing distractions and providing a customized audio experience for each person in a vehicle, audio zoning has the potential to decrease cost and physical weight in the production of a vehicle. Weight is a crucial factor to an automotive manufacturer, especially for electric vehicles. Decreasing vehicle weight directly leads to increasing vehicle range. Replacing large audio systems with lighter parametric speakers, such as directed sound source 114, could have a huge impact on weight reduction. Not only do parametric speakers weigh significantly less than in-dash sound systems, but they are significantly cheaper to manufacture.

In some embodiments, updates and enhancements of the directed sound transmission system disclosed herein may couple a directed sound source with adaptable phononic sound barriers. Phononic structures produce phononic band-gaps, which are frequency regions where waves cannot penetrate the structure in any direction. These sound barriers could be of particular importance in the high-end ride sharing market. One example is they could allow for complete acoustic isolation in a frequency range of interest between the driver and the passenger, allowing the passenger complete privacy.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain methods, events, states, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

The term "adjacent" is used to mean "next to or adjoining". For example, the disclosure includes "the at least one directed sound source is located adjacent a head of the user." In this context, "adjacent a head of the user" is used to mean that the at least one directed sound source is located next to a head of the user. The placement of the at least one directed sound source in a ceiling above a head of the user, such as in a vehicle ceiling, would fall under the meaning of "adjacent" as used in this disclosure.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A method for performing live translation, comprising:
   taking a plurality of audio samples at a plurality of locations within a listening environment;
   determining an associated language at one of the plurality of locations within the listening environment;
   translating an associated language at one or more of the plurality of locations within the listening environment to the associated language of another of the one or more of the plurality of locations within the listening environment;
   modulating one or more ultrasonic pressure waves by audio content, in a language associated with one or more target locations in the listening environment, to produce one or more modulated carrier signals;
   sending the one or more modulated carrier signals, to one or more target locations in the listening environment, through a transmission medium, wherein in connection with the one or more ultrasonic pressure waves reaching the one or more target locations, the one or more modulated carrier signals demodulate.

2. The method for performing live translation, as recited in claim 1, wherein the listening environment is a vehicle selected from the group consisting of a vehicle having an internal combustion engine, an electric vehicle, and a combination thereof.

3. The method for performing live translation, as recited in claim 2, wherein each of the plurality of locations within the listening environment is a seating location within the listening environment.

4. The method for performing live translation, as recited in claim 1, further comprising:
producing white Gaussian noise;
modulating the one or more ultrasonic pressure waves by the Gaussian noise to produce one or more modulated noise signals; and
transmitting, to the one or more target locations in the listening environment, the one or more modulated noise signals through the transmission medium.

5. A method for performing live translation, comprising:
sampling sound by taking one or more sound samples from a listening environment;
identifying a language, when present, inherent within audio information received from the one or more sound samples;
producing an audio content signal from the audio information in the language;
determining noise in the listening environment;
producing a noise signal from the noise;
producing an inverted noise signal by inverting the noise signal;
generating a first modulated ultrasonic signal by modulating an ultrasonic carrier with the inverted noise signal;
generating a second modulated ultrasonic signal by modulating an ultrasonic carrier with the audio content signal;
transmitting, to a target in the listening environment, an ultrasonic pressure wave, representative of the first modulated ultrasonic signal and the second modulated ultrasonic signal, through a transmission medium.

6. The method for performing live translation, as recited in claim 5, wherein the listening environment is selected from the group consisting of a vehicle environment, a ride sharing environment, and mass transportation.

7. The method of performing live translation, as recited in claim 5, further comprising controlling the live translation using a mobile application.

8. The method of performing live translation, as recited in claim 5, wherein the target is one of a plurality of seat positions in a vehicle environment.

9. A method of performing live translation, comprising:
sampling sound by taking one or more sound samples from a plurality of different locations within a listening environment;
identifying a language, when present, inherent within audio information received from one or more sound samples from each location within the listening environment;
producing an audio content signal for an associated location from the audio information received from the one or more sound samples for each location within the listening environment, in the language;
determining noise in the listening environment;
producing a noise signal from the noise;
producing an inverted noise signal by inverting the noise signal;
generating a first modulated ultrasonic signal by modulating an ultrasonic carrier with the inverted noise signal;
generating a second modulated ultrasonic signal, for an associated location, by modulating an ultrasonic carrier with the audio content signal from an associated location; and
transmitting, to a selected location within the listening environment, an ultrasonic pressure wave, representative of the first modulated ultrasonic signal and the second modulated ultrasonic signal associated with the selected location, through a transmission medium.

10. The method of performing live translation, as recited in claim 9, wherein the listening environment is selected from the group consisting of a vehicle environment, a ride sharing environment, a restaurant, a lobby, a sports bar a kiosk with live translation capability and a combination thereof.

11. The method of performing live translation, as recited in claim 9, wherein the plurality of different locations in the listening environment is representative of a mobile device having a capability of receiving an ultrasonic beacon from an ultrasonic transducer.

12. The method of performing live translation, as recited in claim 9, further comprising controlling directional sound transmission using a mobile application.

13. The method of performing live translation, as recited in claim 9, wherein the selected location within the listening environment is one of a plurality of seat positions in a vehicle environment.

14. A focused beam directional speaker system, comprising:
a noise detector;
at least one microphone;
a noise cancelling processor configured to produce a noise signal, representative of noise detected by the noise detector, and an inverse noise signal produced by inverting the noise signal;
an audio processor configured to identify a language, when present, inherent within audio information received from the at least one microphone and to produce an audio content signal from audio information in the language;
a summer configured to produce a combined input signal by summing the inverse noise signal and the audio content signal;
a modulator configured to produce a modulated carrier signal by modulating an ultrasonic carrier signal with the combined input signal; and
at least one ultrasonic focused beam directional speaker configured to send, to a target in a listening environment, an ultrasonic pressure wave, representative of the modulated carrier signal, through a transmission medium, wherein in connection with the ultrasonic pressure wave reaching the target, the modulated carrier signal demodulates, thereby canceling noise and delivering the audio content signal to the target in the listening environment.

15. The focused beam directional speaker system, as recited in claim 14, wherein the at least one microphone is operatively associated with the at least one ultrasonic focused beam directional speaker.

16. The focused beam directional speaker system, as recited in claim 14, further comprising a master controller, being operable to control the focused beam directional speaker system, coupled to the at least one ultrasonic focused beam directional speaker.

17. The focused beam directional speaker system, as recited in claim 16, wherein the master controller operatively controls, via a wireless link, the at least one ultrasonic focused beam directional speaker.

18. The focused beam directional speaker system, as recited in claim 16, wherein the master controller operatively controls, via a wired link, the at least one ultrasonic focused beam directional speaker.

19. The focused beam directional speaker system, as recited in claim 14, wherein a light is associated with each speaker of the at least one ultrasonic focused beam directional speaker, wherein the light is operable to illuminate a color in a blinking manner to identify a speaker of the at least one ultrasonic focused beam directional speaker, wherein the light is operatively synced to music, and wherein the light is operative to perform a function consisting of blinking, displaying a solid color or displaying a combination of different colors, and wherein the light is a red-green-blue (RGB) light emitting diode (LED).

20. The focused beam directional speaker system, as recited in claim 14, wherein one or more locations in the listening environment is representative of a mobile device having a capability of receiving an ultrasonic beacon from an ultrasonic transducer, and wherein the noise detector, the at least one microphone, the noise cancelling processor, the summer, the modulator, and the ultrasonic transducer are controllable remotely.

21. The focused beam directional speaker system, as recited in claim 14, wherein the audio processor is programmed in connection with an application executed on a mobile device.

22. The focused beam directional speaker system, as recited in claim 14, wherein the at least one ultrasonic focused beam directional speaker is in/mounted on a ceiling of a vehicle.

23. The focused beam directional speaker system, as recited in claim 14, further comprising a memory coupled to the audio processor, wherein language data, pertaining to a plurality of languages, is stored on the memory.

* * * * *